United States Patent
Royal et al.

(10) Patent No.: US 11,888,851 B2
(45) Date of Patent: *Jan. 30, 2024

(54) IDENTITY PROXY AND ACCESS GATEWAY

(71) Applicant: CLOUDFLARE, INC., San Francisco, CA (US)

(72) Inventors: James Howard Royal, Austin, TX (US); Samuel Douglas Rhea, Lisbon (PT)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,355

(22) Filed: Jul. 18, 2022

(65) Prior Publication Data
US 2023/0110111 A1    Apr. 13, 2023

Related U.S. Application Data

(63) Continuation of application No. 17/500,159, filed on Oct. 13, 2021, now Pat. No. 11,394,710.

(51) Int. Cl.
*H04L 29/06* (2006.01)
*H04L 9/40* (2022.01)

(52) U.S. Cl.
CPC ...... *H04L 63/0884* (2013.01); *H04L 63/0281* (2013.01); *H04L 63/20* (2013.01)

(58) Field of Classification Search
CPC . H04L 63/0884; H04L 63/0281; H04L 63/20; H04L 63/10
See application file for complete search history.

(56) References Cited

U.S. PATENT DOCUMENTS

| | | | |
|---|---|---|---|
| 2015/0215315 A1* | 7/2015 | Gordon ................... | G06F 21/31 726/5 |
| 2016/0065563 A1* | 3/2016 | Broadbent .......... | H04L 63/0281 726/9 |

(Continued)

OTHER PUBLICATIONS

Khalid, Umer, et al. "Cloud based secure and privacy enhanced authentication & authorization protocol." Procedia Computer Science 22 (2013): 680-688. (Year: 2013) (Year: 2013).*

(Continued)

*Primary Examiner* — Ka Shan Choy
(74) *Attorney, Agent, or Firm* — NICHOLSON DE VOS WEBSTER & ELLIOTT LLP

(57) ABSTRACT

A server transmits to a third-party application a request for a resource that is received from a client. The server receives an authentication request from the client device that has been generated by the third-party application. The server transmits an identity provider selection page to the client device that allows the client device to select an identity provider. The server causes the client device to transmit a second authentication request to a selected identity provider. The server receives an authentication response that was generated by the identity provider that includes the identity of the user. The server enforces access rule(s) including identity-based rule(s) and/or non-identity based rule(s). If the user is permitted to access the third-party application, the server causes an authentication response to be transmitted from the client device to the third-party application that indicates the user has successfully authenticated.

21 Claims, 7 Drawing Sheets

(56) References Cited

U.S. PATENT DOCUMENTS

| | | | | |
|---|---|---|---|---|
| 2016/0156592 A1* | 6/2016 | Walters | .............. | H04L 63/0272 |
| | | | | 726/7 |
| 2017/0063836 A1* | 3/2017 | Cui | .................... | H04L 63/0884 |
| 2019/0089676 A1* | 3/2019 | Gigov | ................. | H04L 63/0884 |
| 2021/0266306 A1* | 8/2021 | Furman | ................ | H04L 63/205 |

OTHER PUBLICATIONS

Khalid, Umer, et al. "Cloud based secure and privacy enhanced authentication & authorization protocol." Procedia Computer Science 22 (2013): 680-688. (Year: 2013).

Notice of Allowance, U.S. Appl. No. 17/500,159, dated Mar. 17, 2022, 11 pages.

* cited by examiner

IDENTITY PROXY AND ACCESS GATEWAY

CROSS-REFERENCE TO RELATED APPLICATIONS

This application is a continuation of application Ser. No. 17/500,159, filed Oct. 13, 2021, which is hereby incorporated by reference.

FIELD

Embodiments of the invention relate to the field of network security; and more specifically, to an identity proxy and access gateway.

BACKGROUND

Sharing identity across multiple partners or contractors is cumbersome and prone to errors. For instance, if an internal organization has an application that is to be shared with an external party (e.g., partner, contractor), the internal organization and the external party need to agree on a source of identity.

One way is for the internal organization to onboard the external party to their own identity provider. Although this gives the internal organization control of identity, it also adds overhead in terms of time and cost. For instance, the internal organization may spend time instructing the external party to sign-up and learn the tool and may have to pay for additional seat licenses (even if just temporary) for the external party. Also, the external party typically has another password to manage for access to the internal resources. The overhead increases as the number of parties increases.

Another way is to federate the identity. The internal organization may connect their own directory service to the external party's equivalent service, and administrators merge the two services together to trust each other. The external party may login using their own credentials. Although this way avoids introducing new passwords, both organizations must dedicate time to integrate their identity providers; and some identity providers may not be integrated. Federation is typically only available for large entities, making it unavailable to single users or freelancers.

Some internet security solutions can provide security for a hosted internal application where the authoritative DNS for that application is changed to the internet security service. All DNS queries and HTTP requests then flow through that internet security service, which can then enforce rules for each HTTP request for that application. However, remote applications, such as SaaS applications, are typically provided as a third-party service where control over how those remote applications are reached is dependent on that third-party service. The access control to these remote applications depends on the third-party service and can vary greatly depending on the remote application. For example, some may allow for rules based on location or device rules, where others do not. Also, logging and permissions vary across the remote applications. Some allow for very granular logging capabilities whereas others may have non-existent controls and logging.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
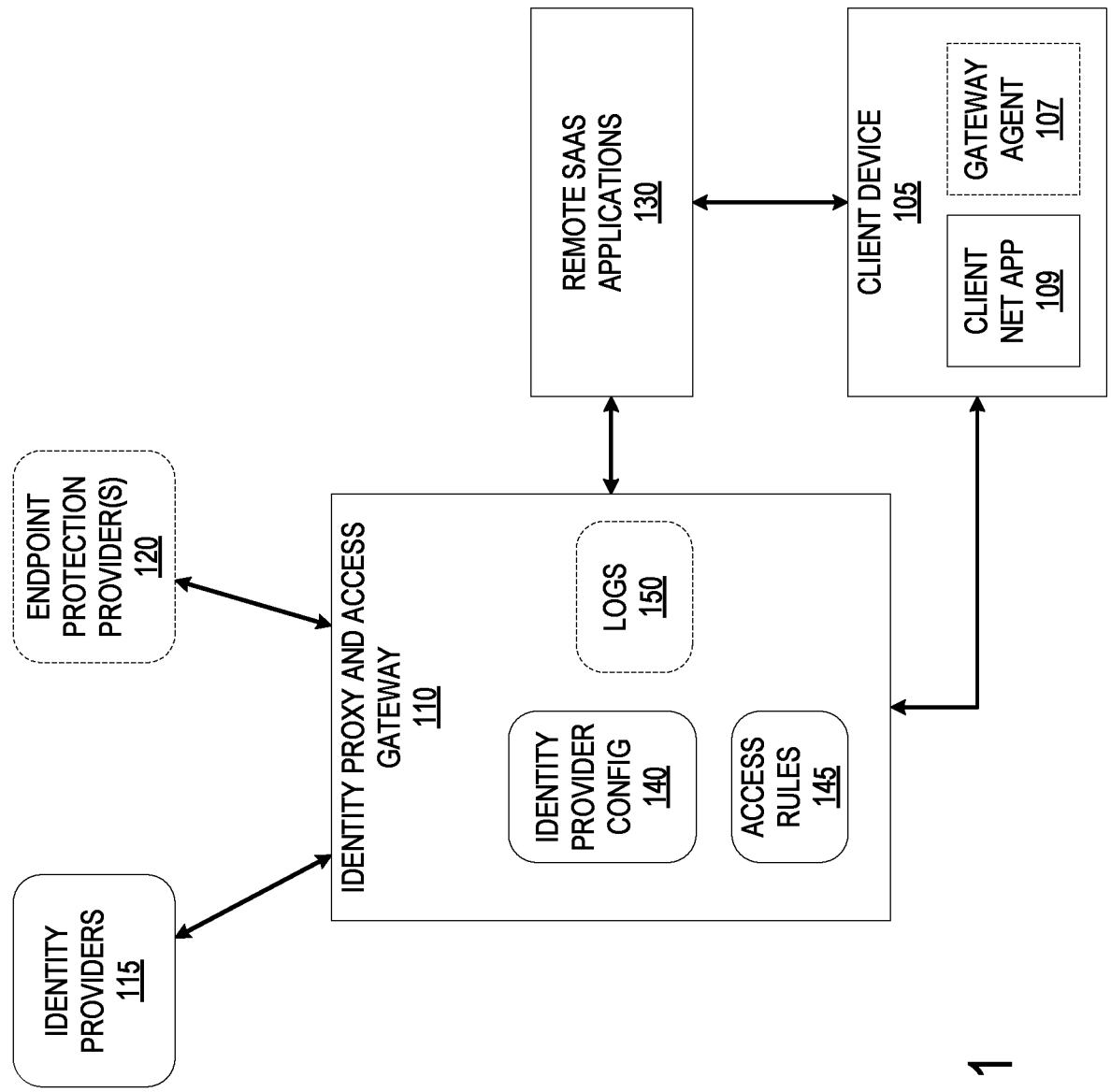
FIG. 1 shows an example of an identity proxy and access rules for multiple identity providers and multiple service providers according to an embodiment.

An identity proxy and access gateway proxies between multiple identity providers and multiple remote SaaS applications. When a user is logging into a remote SaaS application, the user is presented with identity provider options of the identity providers. For instance, the user may select to provide identity (e.g., provide login credentials) to one of the identity providers that are presented. Each identity provider may have their own requirements and/or rules that must be followed to prove identity, such as requiring multifactor authentication, etc. If a user successfully proves identity with one of the identity providers, that identity provider shares the user identity and optionally other metadata with the identity proxy and access gateway.

The identity proxy and access gateway allows customers to define requirements for accessing a resource and/or application of a remote SaaS application. These requirements are in addition to any requirement set by the identity provider and/or the remote SaaS application. These requirements may be based on identity-based access rules and/or non-identity based access rules. For instance, an identity-based access rule may define email addresses or groups of email addresses that are allowed and/or not allowed to access the resource or remote SaaS application. A non-identity based access rule is an access rule that is not based on identity of the user such as location (e.g., geographic region such as the country of origin), device posture, time of request, type of request, IP address, multifactor authentication status, multifactor authentication type, type of device, type of client network application, whether the request is associated with a gateway agent on the client device, and/or other layer 3, layer 4, and/or layer 7 policies. When a user attempts to connect to the remote SaaS application and/or a resource of the remote SaaS application, the identity proxy and access gateway enforces the applicable rule(s). The identity proxy and access gateway allows the user to access the remote SaaS application only if the criteria are met.

In an embodiment, all traffic between a client device and a remote SaaS application is received through the identity proxy and access gateway. For instance, the client device may have an agent that intercepts all outgoing internet traffic to the remote SaaS application and transmits that traffic to the identity proxy and access gateway. The identity proxy and access gateway may enforce the access rule(s) on each request or connection to the remote SaaS application, which may include that requesting client devices are using a compliant agent. As an example, a customer may define a rule where if a certain keyword or path is in the requested URL, only certain user(s) can access the corresponding page. As another example, a customer may define a rule where if a certain keyword or other asset is included in the requested content, only certain user(s) can access the corresponding page and/or asset (e.g., sensitive data may be prevented from appearing on a page). The identity proxy and access gateway may also log each connection and/or request to the remote SaaS application. This allows for visibility, logging, and/or control over a user within the remote SaaS application.

The logged data may be used for audits and/or inspections. For instance, the logs may specify which user accessed a given resource (e.g., a customer's account) within the remote SaaS application, when the user accessed the resource, if the user modified the resource, if the user downloaded the resource, etc. The information that is logged may be different, and in some cases in addition to, the information that may be logged by the given remote SaaS application. For instance, the remote SaaS application may have its own internal logging functionality that may only log when someone successfully logs into the application; whereas the data logged by the identity proxy and access gateway service may log each request (e.g., each unique page visited) for the application in addition to when someone successfully logs into the application. Further, the logs for multiple remote SaaS applications can be accessed from a central location.

Rules can be written for the logged data. For instance, a rule can be defined that sends a notification when a new user (e.g., a new employee) accesses a high-profile customer account in a remote SaaS application. The logged data may be fed into a security information and event management (SIEM) system.

FIG. 1 shows an example of an identity proxy and access rules for multiple identity providers and multiple service providers according to an embodiment. The system includes a client device 105, the identity proxy and access gateway 110, the identity providers 115, the endpoint protection provider(s) 120, and the remote SaaS applications 130.

The identity proxy and access gateway 110 executes on one or more servers. The identity proxy and access gateway 110 may be provided by a cloud computing network. The cloud computing network includes multiple data centers that each include multiple servers respectively. Each of these servers and/or data centers may execute an instance of the identity proxy and access gateway 110.

The identity proxy and access gateway 110 proxies between multiple identity providers 115 and multiple remote SaaS applications 130. The system is configured such that when a user (represented by the client device 105) visits one of the remote SaaS applications 130 and proof of identity is requested (e.g., the user is logging into the SaaS application), the user is presented with identity provider options of the identity providers 115. The identity providers 115 that are presented can be configured by a customer of the system and stored as the identity provider configuration 140. The multiple identity providers 115 may each have their own requirements or rules that must be followed to prove identity. For instance, a first identity provider may be configured to require multifactor authentication and a second identity provider may not. If the user successfully proves identity with one of the identity providers 115 (e.g., the user successfully logged into the selected identity provider), that identity provider 115 shares the user identity and optionally other metadata with the identity proxy and access gateway 110.

The client device 105 is a computing device (e.g., laptop, desktop, smartphone, mobile phone, tablet, gaming system, set top box, internet-of-things (IoT) device, wearable device, or another network device) that can transmit and receive network traffic. The client device 105 executes a client network application 109 such as a web browser or other application that can access network resources. The client device 105 may include a gateway agent 107 that securely connects to the cloud computing network. For instance, the gateway agent 107 may establish a tunnel connection (e.g., a VPN connection) with a server that is executing the identity proxy and access gateway 110 and intercept all outgoing internet traffic or a defined subset of traffic and transmit the traffic over the tunnel to the server. The tunnel connection may be a WireGuard point-to-point tunnel or another secure tunnel such as TLS, IPsec, or HTTP/2. The gateway agent 107 may connect with the identity proxy and access gateway 110 regardless of the internet connection of the client device 105. For instance, the client device 105 may be on a public Wi-Fi network or other network not owned or controlled by the customer. The gateway agent 107 may be configured to transmit identity information of the user of the client device (e.g., an email address, a unique device identifier, a unique identifier tied to the agent, an organization identifier to which the user belongs, etc.) to the identity proxy and access gateway 110.

The customer of the system may define the requirements a user must meet to access a particular resource and/or application of the remote SaaS application 130. These requirements are stored in the access rules 145. These requirements may be based on identity-based access rules and/or non-identity based access rules. An identity-based access rule is based on the identity information provided by the identity provider 115 (e.g., username, email address, etc.). For instance, an identity-based access rule may define email addresses or groups of email addresses (e.g., all emails ending in @example.com) that are allowed and/or not allowed. A non-identity based access rule is a rule that is not based on identity. Examples include rules based on location (e.g., geographic region such as the country of origin), device posture, time of request, type of request, IP address, multifactor authentication status, multifactor authentication type, type of device, type of client network application, whether the request is associated with a gateway agent on the client device, and/or other layer 3, layer 4, and/or layer 7 policies.

The identity information can be provided by the selected identity provider 115. To determine device posture, for example, the identity proxy and access gateway 110 may access the endpoint protection provider(s) (EPP(s)) 120 to determine the posture of the client device 105. The identity proxy and access gateway 110 may determine other parameters based on the request (e.g., IP address, location, time of request, type of request, type of device and/or client network application). The identity proxy and access gateway 110 determines, based on the access rules 145 and the parameters associated with the request, whether access is allowed.

If the identity proxy and access gateway 110 determines that the user is allowed access to the remote SaaS application 130, the identity proxy and access gateway 110 transmits the user authorization to the remote SaaS application 130 (e.g., redirecting the client device 105 to transmit the user authorization to the remote SaaS application 130). The remote SaaS application 130 uses this information to determine whether access is allowed. Thereafter, the user may access the application provided by the remote SaaS application 130.

The identity proxy and access gateway 110 may log the access interactions. For instance, the identity proxy and access gateway 110 may log each connection and/or request to a remote SaaS application 130 (stored as the logs 150). The logged data may be used for audits and/or inspections. For instance, the logs may specify which user accessed a given resource (e.g., a customer's account) within the remote SaaS application, when the user accessed the resource, if the user modified the resource, if the user downloaded the resource, etc. The information that is logged may be different, and in some cases in addition to, the information that may be logged by the given remote SaaS application 130. For instance, the remote SaaS application 130 may have its own internal logging functionality that may only log when someone successfully logs into the application; whereas the data logged by the identity proxy and access gateway 110 may log each request (e.g., each unique page visited) for the application in addition to when someone successfully logs into the application. The logged data may be stored in a central location that is available to customers of the service. Rules can be written for the logged data. For instance, a rule can be defined that sends a notification when a new user (e.g., a new employee) accesses a high-profile customer account in a remote SaaS application. The logged data may be fed into a security information and event management (SIEM) system.

The identity proxy and access gateway 110 may be executed on a compute server of a distributed cloud computing network. The distributed cloud computing network includes multiple geographically distributed nodes. Each node may include one or more compute servers, one or more control servers, one or more DNS servers, and one or more other pieces of networking equipment (e.g., routers, switches, hubs, etc.). The node may be part of the same physical device or multiple physical devices. For example, the compute server(s), control server(s), and DNS server(s) may be virtual instances running on the same physical device or may be separate physical devices. Each node may be part of a data center or a collocation site. The nodes may be geographically distributed that decreases the distance between requesting client devices and content. Thus, there may be multiple servers providing the functionality of the identity proxy and access gateway 110.

Figure 2:
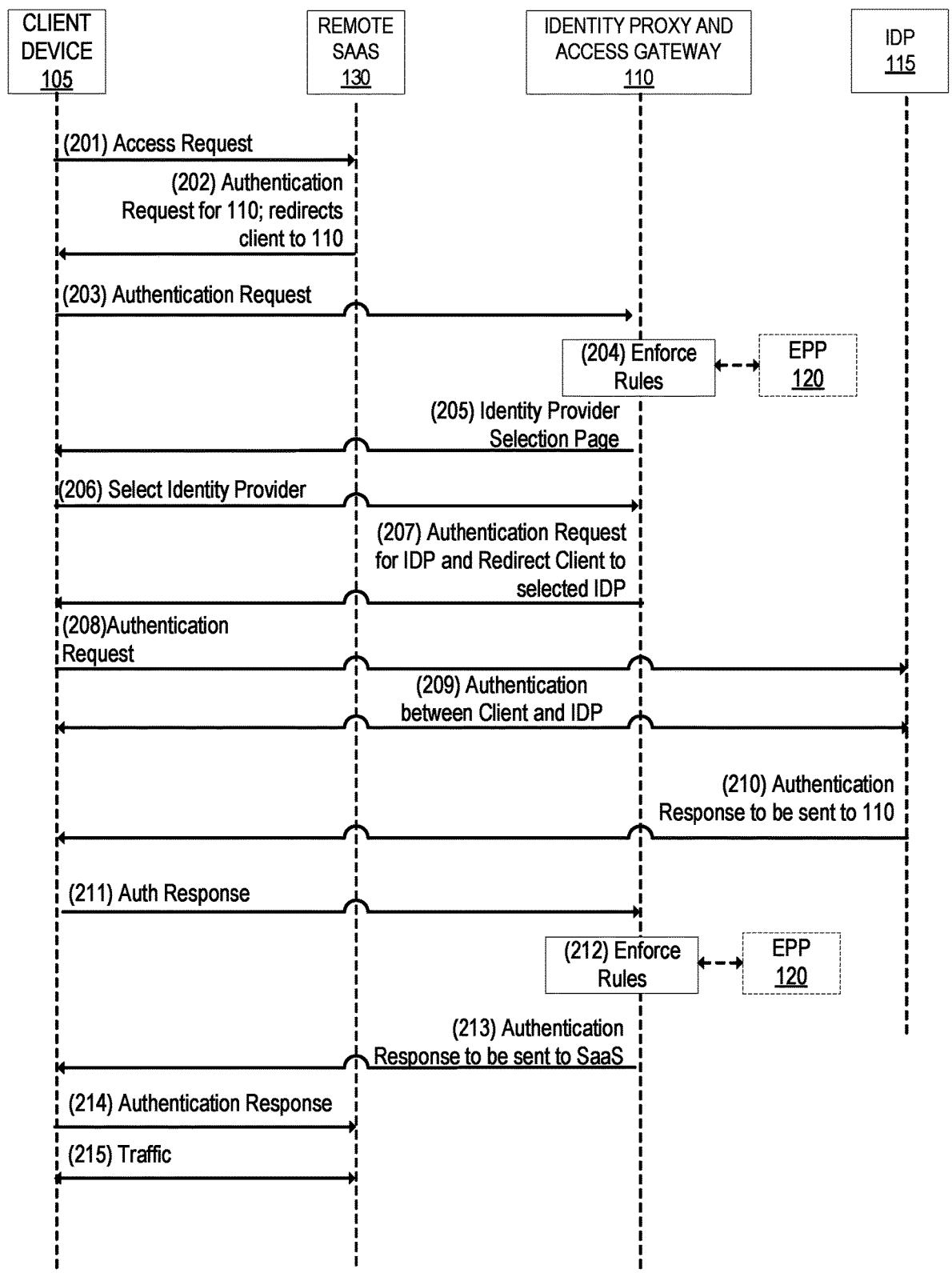
FIG. 2 is a sequence diagram that illustrates exemplary operations for an identity proxy protected with access rules according to an embodiment.

FIG. 2 is a sequence diagram that illustrates exemplary operations for an identity proxy protected with access rules according to an embodiment.

The client device 105 requests access to a remote SaaS application 130 at operation 201. The requested access may be a resource that is protected such that only authorized users are allowed access to the resource. For example, the requested access may be a login request to the remote SaaS application 130. The remote SaaS application 130 is configured such that the identity proxy and access gateway 110 is the identity provider. For instance, the remote SaaS application 130 is configured such that authentication requests will be sent to the identity proxy and access gateway 110. The remote SaaS application 130 may be a Security Assertion Markup Language (SAML) compliant application. Thus, at operation 202, the remote SaaS application 130 transmits an authentication request for the identity proxy and access gateway 110 to authenticate the user requesting access and redirects the client to transmit the authentication request to the identity proxy and access gateway 110. The client device 105 transmits the authentication request to the identity proxy and access gateway at operation 203. The authentication request may be a SAML AuthnRequest.

The identity proxy and access gateway 110 receives the authentication request. Although the identity proxy and access gateway 110 is configured as the identity provider for the remote SaaS application 130, in an embodiment the identity proxy and access gateway 110 does not store identity information. Instead, the identity proxy and access gateway 110 proxies the identity request with one or more identity providers 115. In an embodiment, one or more identity provider(s) 115 are presented to the client device for selection, where the identity provider(s) that are presented can be configured by a customer of the system. Thus, at operation 205, the identity proxy and access gateway 110 transmits an identity provider selection page to the client device 105. The identity provider selection page includes the one or more identity provider options configured by the customer. The identity proxy and access gateway 110 may log the event.

In an embodiment, prior to transmitting the identity provider selection page at operation 205, the identity proxy and access gateway 110 enforces a set of one or more access rules to determine whether to proceed with the login flow at operation 204. For instance, non-identity rule(s) may be configured that specify rules for accessing or not accessing the requested service. Example non-identity rules include rules based on location (e.g., geographic region such as the country of origin), device posture, time of request, type of request, IP address, multifactor authentication status, multifactor authentication type, type of device, type of client network application, and/or other layer 3, layer 4, and/or layer 7 policies. To determine device posture, for example, the identity proxy and access gateway 110 accesses the EPP(s) 120 to determine the posture of the client device 105. The identity proxy and access gateway 110 may determine other parameters based on the request (e.g., IP address, location, time of request, type of request, type of device and/or client network application).

The client device 105 receives the identity provider selection page. The identity provider selection page includes the one or more identity provider options configured by the customer. The user of the client device 105 can select one of the identity provider options. At operation 206, the identity proxy and access gateway 110 receives the identity provider selection from the client device 105.

The identity proxy and access gateway 110 generates an authentication request for the selected identity provider and redirects the client device 105 to transmit the authentication request to the selected identity provider 115 at operation 207. In this authentication request, the identity proxy and access gateway 110 essentially is taking the role of the service provider. This authentication request may be a SAML AuthnRequest. The client device receives this authentication request and transmits the authentication request to the selected identity provider at operation 208.

The client device 105 and the selected identity provider 115 then perform an authentication according to the rules and requirements at the selected identity provider 115 at operation 209. For instance, the user of the client device 105 may provide credentials (e.g., username/password) and may be required to perform multifactor authentication. In the example of FIG. 2, the user has successfully authenticated to the selected identity provider 115. As a result, at operation 210, the identity provider 115 generates and transmits an authentication response to the client device 105 that includes the user identity and optionally other metadata about the user for the client device 105 to transmit to the identity proxy and access gateway 110. The client device 105 transmits the authentication response to the identity proxy and access gateway 110 at operation 211. The authentication response message may be any type of protocol for communicating identity. For instance, the authentication response may be a SAML message, an OpenID connect (OIDC) message, or other protocol for sending identity.

The identity proxy and access gateway 110 enforces one or more access rules at operation 212. The access rule(s) enforced at operation 212 include identity-based rules and/or non-identity based rules. The identity-based rule(s) are based on the identity of the user (e.g., provided by the IDP 115) such as a username, email address, etc., and may, for example, determine whether the identified user has access rights to the requested object at the remote SaaS 130. The non-identity rule(s) are not based on the identity of the user and may, for example, specify rules for accessing or not accessing the requested service. Example non-identity rules include rules based on location (e.g., geographic region such as the country of origin), device posture, time of request, type of request, IP address, multifactor authentication status, multifactor authentication type, type of device, type of client network application, and/or other layer 3, layer 4, and/or layer 7 policies.

The identity information is provided by the selected identity provider 115 in the authentication response. To determine device posture, for example, the identity proxy and access gateway 110 accesses the EPP(s) 120 to determine the posture of the client device 105. The identity proxy and access gateway 110 may determine other parameters based on the request (e.g., IP address, location, time of request, type of request, type of device and/or client network application).

The identity of the EPP(s) 120 that are used, if any, may be configured by the customer of the system. Thus, in the example of FIG. 2, if the access rules include a rule based on device posture, the identity proxy and access gateway 110 can make a device posture call to the EPP(s) 120 to determine the posture of the client device 105. The EPP(s) determine the posture of the client device 105, which can include information such as patch status, management status, vulnerability score, etc. For instance, the EPP can determine if the client device is a healthy device and/or managed correctly as determined by configuration set at the EPP. The EPP(s) 120 transmit a device posture response to the identity proxy and access gateway 110. The response may indicate whether the client device 105 satisfies their requirements or rules (e.g., whether the client device 105 is healthy and/or compliant). An EPP 120 may be a remote server or in some cases may be an agent that is executing on the client device 105.

The identity proxy and access gateway 110 determines, based on the access rules 145, whether access is allowed. The rules and requirements are in addition to any rule or requirement of the identity provider and/or the remote SaaS application. FIG. 2 assumes that access is allowed. After determining that access is allowed, the identity proxy and access gateway 110 proceeds with the access flow to the SaaS application. At operation 213, the identity proxy and access gateway 110 generates and transmits an authentication response to the client device 105 that is to be sent to the remote SaaS application 130. The response may include a form with information for the client device 105 to transmit to the remote SaaS application 130. The authentication response may be a SAML AuthnResponse.

At operation 214, the client device 105 transmits the authentication response to the remote SaaS application 130. The remote SaaS application 130 processes the response and allows access to the requested object. At operation 215, the client device 105 may then interact with the requested object at the remote SaaS application 130.

In an embodiment, after determining that access is allowed, the identity proxy and access gateway 110 summarizes the variables used to make that decision into a standard proof of identity such as a JSON Web Token (JWT). This standard proof of identity may be signed and includes the decision (whether authorized) and information about the user. This standard proof of identity may be stored in the user's browser and can be used as proof of identity for the duration of their session. For instance, the proof of identity may include the user identity (e.g., the email address of the user), an authentication domain (e.g., the domain that signs the token), the authentication method reference (amr) values such as the multifactor authentication method used, the location (e.g., country) where the user is connecting from, the audience (e.g., the domain of the application being requested), the expiration time at which the token is no longer valid, and/or a signature that allows a receiving party to validate the message.

Some remote SaaS applications support JWT while others do not. For those that support JWT, the identity proxy and access gateway 110 transmits the generated JWT to the remote SaaS application 130 (e.g., via a client redirection) and the user can login. For those that do not support JWT, the identity proxy and access gateway 110 converts the JWT into a standard the remote SaaS application 130 supports (e.g., SAML). For instance, the authentication response transmitted in operation 213 may include a JWT if the remote SaaS application 130 supports JWT. If the remote SaaS application 130 does not support JWT, the identity proxy and access gateway 110 may convert the generated JWT to a SAML authentication response message that is transmitted in operation 213.

Figure 3:
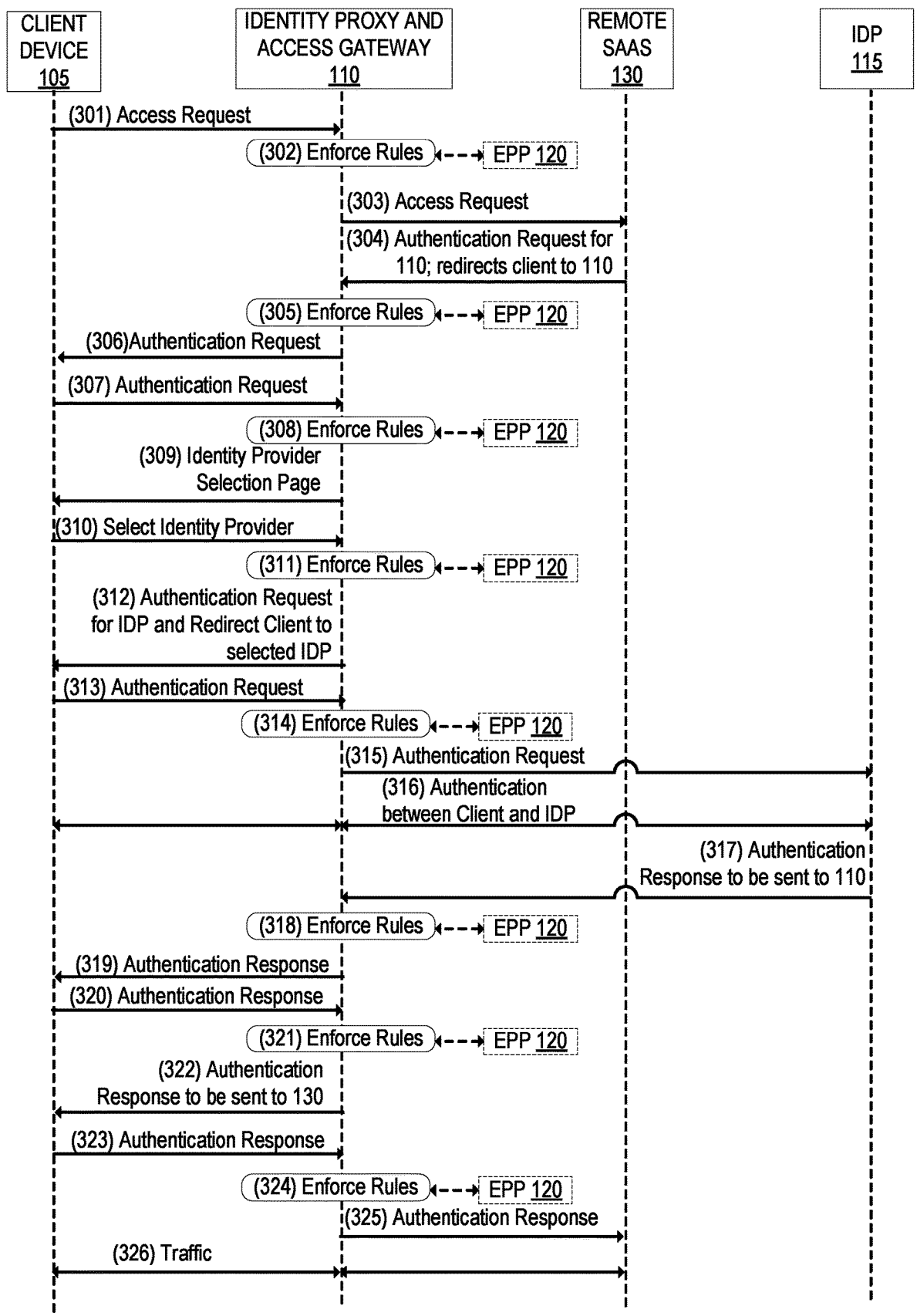
FIG. 3 is a sequence diagram that illustrates exemplary operations for an identity proxy protected with access rules according to an embodiment.

FIG. 3 is a sequence diagram that illustrates exemplary operations for an identity proxy protected with access rules according to an embodiment. In the embodiment of FIG. 3, traffic of the client device 105 is received at the identity proxy and access gateway 110. For instance, the client device 105 may be executing an agent 107 that securely connects to the identity proxy and access gateway 110. For instance, the agent 107 may establish a tunnel connection (e.g., a VPN connection) with a server that is executing the identity proxy and access gateway 110 and intercept all outgoing internet traffic or a defined subset of traffic and transmit the traffic over the tunnel to the server. The tunnel connection may be a WireGuard point-to-point tunnel or another secure tunnel such as TLS, IPsec, or HTTP/2. The agent 107 may connect with the identity proxy and access gateway 110 regardless of the internet connection of the client device 105. For instance, the client device 105 may be on a public Wi-Fi network or other network not owned or controlled by the customer. The agent 107 may be configured to transmit identity information of the user of the client device (e.g., an email address, a unique device identifier, a unique identifier tied to the agent, an organization identifier to which the user belongs, etc.) to the identity proxy and access gateway 110. As another example, the client device 105 may be on a private network belonging to the customer (e.g., an office network) where traffic is received at the identity proxy and access gateway 110. For instance, a piece of network equipment (e.g., a router) of a branch office may be configured with a GRE tunnel to the identity proxy and access gateway 110. The identity proxy and access gateway 110 may maintain an identity of the organization (e.g., the customer) associated with the tunnel.

As such, at operation 301, the client device 105 requests access to a remote SaaS application 130. The identity proxy and access gateway 110 may enforce a set of one or more access rules to determine whether to proceed with the login flow at operation 302. The access rule(s) enforced at operation 302 may include identity-based rule(s) (e.g., if identity is provided through an agent executing on the client device 105) and/or non-identity based rule(s). For instance, based on the identity provided by the agent 107 executing on the client device 105, an access rule may be enforced to determine whether the identified user is allowed to access the requested resource at the remote SaaS application 130. Example non-identity rules include rules based on location (e.g., geographic region such as the country of origin), device posture, time of request, type of request, IP address, multifactor authentication status, multifactor authentication type, type of device, type of client network application, whether the request is associated with a gateway agent on the client device, and/or other layer 3, layer 4, and/or layer 7 policies. If an access rule checks the device posture of the client device 105, the identity proxy and access gateway 110 may access the EPP(s) 120 to determine the posture of the client device 105 as previously described herein.

If, based on the enforcement of the access rules, the request is not allowed, the identity proxy and access gateway 110 will block the request. In the example of FIG. 3, the result of enforcing the access rules in operation 302 and other rule enforcement is that the corresponding traffic is allowed. Thus, after enforcing the access rules at operation 302, the identity proxy and access gateway 110 transmits the request for access to the remote SaaS application 130 at operation 303. The request, including the requested object, may be logged.

The remote SaaS application 130 receives the access request. The remote SaaS application 130 is configured such that the identity proxy and access gateway 110 is the identity provider. For instance, the remote SaaS application 130 is configured such that login requests will be sent to the identity proxy and access gateway 110. The remote SaaS application 130 may be a SAML compliant application. Thus, at operation 304, the remote SaaS application 130 transmits an authentication request for the identity proxy and access gateway 110 to authenticate the user requesting access and redirects the client device 105 to transmit the authentication request to the identity proxy and access gateway 110. The identity proxy and access gateway 110 may receive the request and enforce a set of one or more access rules to determine whether to proceed with the request at operation 305. The access rules may be identity based and/or non-identity based as previously described. Enforcing the access rules may include determining the device posture of the client device 105 by accessing the EPP(s) 120 as previously described. If the enforcement of the rules does not block the request, the identity proxy and access gateway 110 transmits the authentication request to the client device 105 at operation 306. The client device 105 in turn transmits the authentication request to the identity proxy and access gateway at operation 307. The authentication request may be a SAML AuthnRequest.

The identity proxy and access gateway 110 receives the authentication request. The identity proxy and access gateway 110 may enforce a set of one or more access rules to determine whether to proceed with the request at operation 308. The access rules may be identity based and/or non-identity based as previously described. Enforcing the access rules may include determining the device posture of the client device 105 by accessing the EPP(s) 120 as previously described.

Although the identity proxy and access gateway 110 is configured as the identity provider for the remote SaaS application 130, in an embodiment the identity proxy and access gateway 110 does not store identity information. Instead, the identity proxy and access gateway 110 proxies the identity request with one or more identity providers 115. In an embodiment, one or more identity provider(s) 115 are presented to the client device for selection, where the identity provider(s) that are presented can be configured by a customer of the system. Thus, at operation 309, the identity proxy and access gateway 110 transmits an identity provider selection page to the client device 105. The identity provider selection page includes the one or more identity provider options configured by the customer. The identity proxy and access gateway 110 may log the event.

The client device 105 receives the identity provider selection page. The identity provider selection page includes the one or more identity provider options configured by the customer. The user of the client device 105 can select one of the identity provider options. At operation 310, the identity proxy and access gateway 110 receives the identity provider selection from the client device 105. The identity proxy and access gateway 110 may enforce a set of one or more access rules to determine whether to proceed with the request at operation 311. The access rules may be identity based and/or non-identity based as previously described. Enforcing the access rules may include determining the device posture of the client device 105 by accessing the EPP(s) 120 as previously described.

The identity proxy and access gateway 110 generates an authentication request for the selected identity provider and redirects the client device 105 to transmit the authentication request to the selected identity provider 115 at operation 312. In this authentication request, the identity proxy and access gateway 110 essentially is taking the role of the service provider. This authentication request may be a SAML AuthnRequest. The client device receives this authentication request and transmits the authentication request to the selected identity provider at operation 313, which is received at the identity proxy and access gateway 110. The identity proxy and access gateway 110 may enforce a set of one or more access rules to determine whether to proceed with the request at operation 314. The access rules may be identity based and/or non-identity based as previously described. Enforcing the access rules may include determining the device posture of the client device 105 by accessing the EPP(s) 120 as previously described. The identity proxy and access gateway 110 transmits the authentication request to the selected identity provider at operation 315.

The client device 105 and the selected identity provider 115 then perform an authentication according to the rules and requirements at the selected identity provider 115 at operation 316. For instance, the user of the client device 105 may provide credentials (e.g., username/password) and may be required to perform multifactor authentication. In the example of FIG. 3, the user has successfully authenticated to the selected identity provider 115. As a result, at operation 317, the identity provider 115 generates and transmits an authentication response to the client device 105 that includes the user identity and optionally other metadata about the user for the client device 105 to transmit to the identity proxy and access gateway 110. This authentication response is received at the identity proxy and access gateway 110. The identity proxy and access gateway 110 may enforce a set of one or more access rules to determine whether to proceed at operation 318. The access rules may be identity based and/or non-identity based as previously described. Enforcing the access rules may include determining the device posture of the client device 105 by accessing the EPP(s) 120 as previously described. The identity proxy and access gateway 110 transmits the authentication response to the client device at operation 319. The client device 105 transmits the authentication response to the identity proxy and access gateway 110 at operation 320. The authentication response message may be any type of protocol for communicating identity. For instance, the authentication response may be a SAML message, an OpenID connect (OIDC) message, or other protocol for sending identity The identity proxy and access gateway 110 enforces one or more access rules at operation 321. The access rule(s) enforced at operation 321 include identity-based rules and/or non-identity based rules as previously described. Identity information is provided by the selected identity provider 115 in the authentication response as well as possibly information from the agent executing on the client device 105. Assuming that access is allowed, at operation 322, the identity proxy and access gateway 110 generates and transmits an authentication response to the client device 105 that is to be sent to the remote SaaS application 130. The response may include a form with information for the client device 105 to transmit to the remote SaaS application 130. The authentication response may be a SAML AuthnResponse. In an embodiment, the authentication response includes a standard proof of identity such as a JWT that includes the decision (e.g., whether authorized) and information about the user. This standard proof of identity may be stored in the client device and can be transmitted as a proof of identity for the duration of the session.

At operation 323, the client device 105 transmits the authentication response to the remote SaaS application 130 that is received at the identity proxy and access gateway 110. The identity proxy and access gateway 110 may enforce a set of one or more access rules to determine whether to proceed at operation 324. The access rules may be identity based and/or non-identity based as previously described. Enforcing the access rules may include determining the device posture of the client device 105 by accessing the EPP(s) 120 as previously described.

The identity proxy and access gateway 110 transmits the authentication response to the remote SaaS application 130 at operation 325. In an embodiment where the identity proxy and access gateway receives a standard proof of identity (e.g., JWT) from the client device 105 as the authentication response that is not supported by the remote SaaS application 130, the identity proxy and access gateway 110 converts the standard proof of identity into a form the remote SaaS application 130 supports. For example, if the remote SaaS application 130 supports SAML, the identity proxy and access gateway 110 converts the standard proof of identity (e.g., the JWT) into a SAML authentication response. If the authentication response received from the client device 105 is supported by the SaaS application 130, the authentication response can be transmitted to the remote SaaS application 130 without being converted. For instance, if the SaaS application 130 supports JWT, the identity proxy and access gateway 110 can transmit the generated JWT to the SaaS application 130.

The remote SaaS application 130 processes the authentication response and allows access to the requested object. At operation 326, the client device 105 may then interact with the requested object at the remote SaaS application 130 through the identity proxy and access gateway 110.

As shown in FIG. 3, the identity proxy and access gateway 110 receives traffic between the client device 105 and other network entities including the remote SaaS application 130 and the identity provider 115. The identity proxy and access gateway 110 may log each connection and/or request to these network entities. The logged data may be used for audits and/or inspections. For instance, the logs may specify which user accessed a given resource (e.g., a customer's account) within the remote SaaS application, when the user accessed the resource, if the user modified the resource, if the user downloaded the resource, etc. The information that is logged may be different, and in some cases in addition to, the information that may be logged by the given remote SaaS application. For instance, the remote SaaS application may have its own internal logging functionality that may only log when someone successfully logs into the application; whereas the data logged by the identity proxy and access gateway service may log each request (e.g., each unique page visited) for the application. Further, the logs for multiple remote SaaS applications can be accessed from a central location.

Rules can be written for the logged data. For instance, a rule can be defined that sends a notification when a new user (e.g., a new employee) accesses a high-profile customer account in a remote SaaS application. The logged data may be fed into a security information and event management (SIEM) system.

Figure 4:
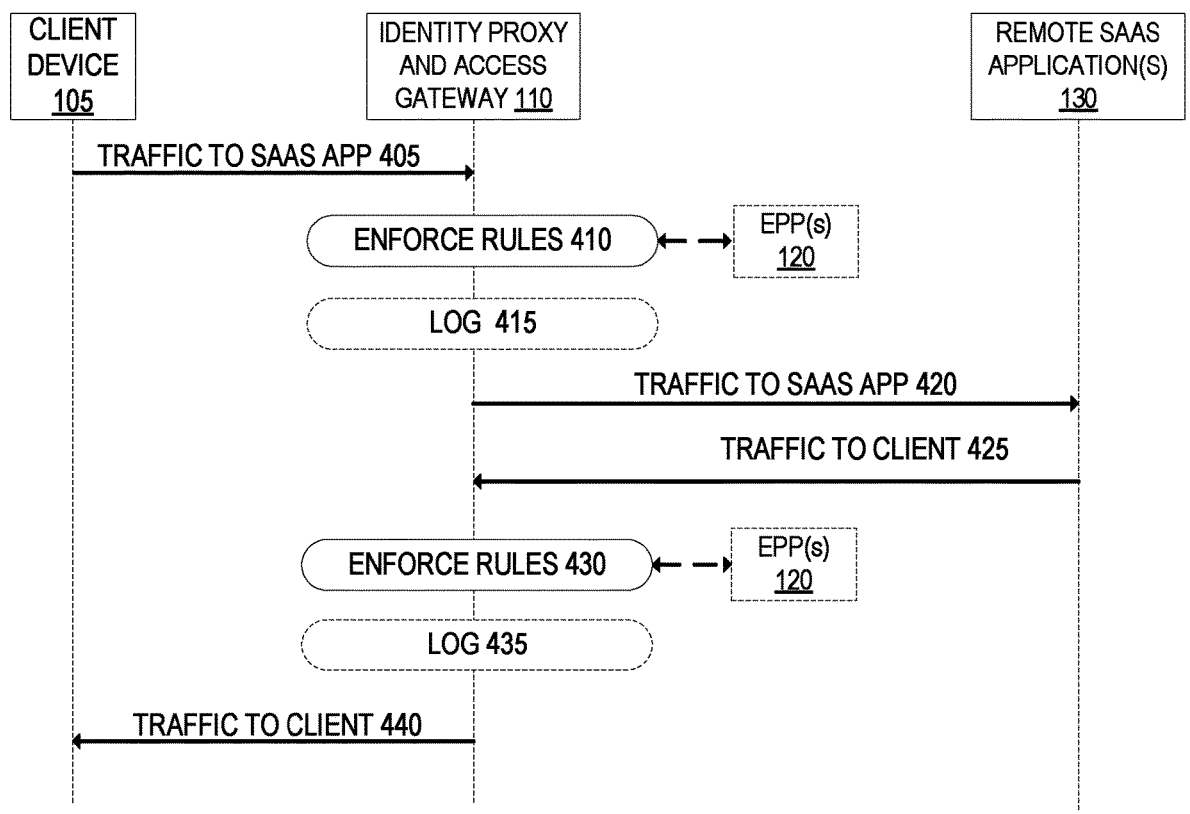
FIG. 4 is a sequence diagram that illustrates exemplary operations for the identity proxy and access gateway receiving traffic between a client device and a remote SaaS application according to an embodiment.

FIG. 4 is a sequence diagram that illustrates exemplary operations for the identity proxy and access gateway receiving traffic between a client device and a remote SaaS application according to an embodiment. The operations of FIG. 4 may occur, for example, after the user of the client device has successfully authenticated and been authorized for a remote SaaS application, such as through the operations of FIG. 3.

At operation 405, the client device 105 transmits traffic that is destined for a remote SaaS application 130. The traffic may be a request to access a particular page at the remote SaaS application 130. The request may include a proof of identity such as a JWT that indicates the user has logged into the remote SaaS application 130. The traffic is received at the identity proxy and access gateway 110 in a way that is like what was described with respect to FIG. 3. The identity proxy and access gateway 110 enforces a set of one or more access rules to determine whether the traffic is allowed to be transmitted to the remote SaaS application 130 at operation 410. The access rule(s) may include identity-based rule(s) and/or non-identity based rule(s) as previously described. As an example, the rule may specify that traffic is not allowed to be transmitted to the remote SaaS application 130 unless the traffic is associated with a gateway agent installed on the client device (e.g., the gateway agent 107). Enforcing the access rules may include determining the device posture of the client device 105 by accessing the EPP(s) 120 as previously described. For example, if the request is to read a resource at the remote SaaS application, the access rule(s) can be enforced to prevent the identified user from viewing that resource unless the access rule(s) are met (e.g., the user is authorized to view that resource). As another example, if the request is to update or add a resource to the remote SaaS application 130, the access rule(s) can be enforced to prevent the identified user from updating or adding the resource to the remote SaaS application unless the access rule(s) are met (e.g., the user is authorized to update or add a resource to the remote SaaS application 130).

Enforcing the access rule(s) may include analyzing the content of the request (e.g., if the request is uploading or updating a resource of the remote SaaS application 130). For instance, the rule(s) may check for personal identifiable information, credit card numbers, data sets that contain specific information, data labels, certain keywords, or other data configured by the customer to determine whether the data can be transmitted. The data labels may be labeled with a category such as a security level category (e.g., unclassified, classified, top secret, etc.), an organization category (e.g., marketing, legal, human resources, engineering, etc.), and a location category. By way of example, a policy may be created that prevents users outside of a specific group of users from uploading a file that contains certain key phrases to any location other than a predefined location (e.g., a particular cloud storage provider).

Optionally, the identity proxy and access gateway 110 logs the request at operation 415. The logged information may identify the resource requested (e.g., the URL of the resource), the user associated with the request, the time of the request, whether the request was successful, source IP address of the request, source port of the request, destination IP address of the request, destination port of the request, etc. The information that is logged may be different, and in some cases in addition to, the information that may be logged by the given remote SaaS application. For instance, the remote SaaS application may have its own internal logging functionality that may only log when someone successfully logs into the application; whereas the data logged by the identity proxy and access gateway service may log each request (e.g., each unique page visited) for the application in addition to when someone successfully logs into the application. Further, the logs for multiple remote SaaS applications can be accessed from a central location.

If the identity proxy and access gateway 110 determines that the traffic is allowed to be transmitted, then the identity proxy and access gateway 110 transmits the traffic to the remote SaaS application 130 at operation 420. At operation 425, the identity proxy and access gateway 110 transmits traffic to the client device 105. The traffic may be a response and include the content requested by the client in operation 405.

At operation 430, the identity proxy and access gateway 110 enforces a set of access rule(s) to determine whether access to the response is allowed. The access rule(s) may include identity-based rule(s) and/or non-identity based rule(s) as previously described and may include determining the device posture of the client device as previously described. Enforcing the access rule(s) may include analyzing the content of the requested asset. For instance, an access rule may be defined such that only certain user(s) can access a page that contains a certain keyword or certain asset. The page could be prevented from being sent to the client device or the sensitive information may be removed or redacted. This can be used to prevent sensitive data from being transmitted to the client device. As another example, the response may include a file that is labeled with a category and the access rule(s) may define the user(s) that are allowed to access files labeled with that category.

Optionally, the identity proxy and access gateway 110 logs the response at operation 435. The logged information may identify the resource requested (e.g., the URL of the resource), the user associated with the request, the time of the request, whether the request was successful, source IP address of the request, source port of the request, destination IP address of the request, destination port of the request, list of file(s) downloaded in the request, list of file(s) blocked, reason why any file(s) were blocked, etc. The information that is logged may be different, and in some cases in addition to, the information that may be logged by the given remote SaaS application.

If the access rule(s) are met, the identity proxy and access gateway 110 transmits the traffic to the client device 105 at operation 440.

Figure 5:
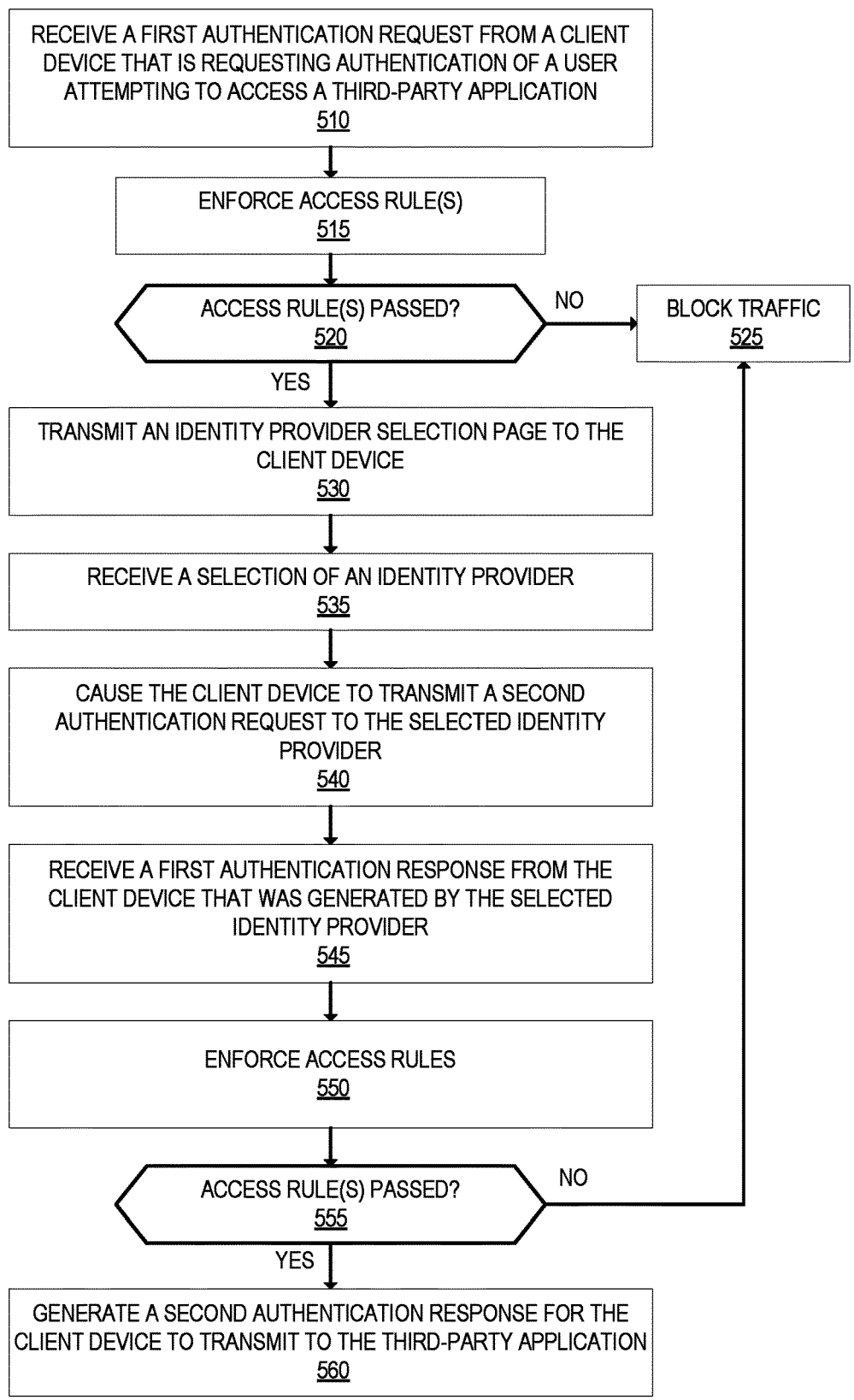
FIG. 5 is a flow diagram that illustrates exemplary operations for an identity proxy and access gateway according to an embodiment.

FIG. 5 is a flow diagram that illustrates exemplary operations for an identity proxy and access gateway according to an embodiment. At operation 510, the identity proxy and access gateway 110 receives a first authentication request from the client device 105. The first authentication request was generated by a third-party application (e.g., the remote SaaS application 130). The first authentication request is requesting authentication of a user attempting to access a resource at the third-party application. The identity proxy and access gateway 110 may receive this authentication request because it is configured as an identity provider for the third-party application. The authentication request may be a SAML AuthnRequest. The identity proxy and access gateway 110 may also validate the request.

Next, at operation 515, the identity proxy and access gateway 110 enforces a set of one or more access rules to determine whether to allow or block the traffic. The access rules may include identity-based rules and/or non-identity based rules as previously described. Enforcing the access rules may include determining the device posture of the client device 105 by accessing the EPP(s) 120 as previously described. If the access rule(s) are satisfied, then operation moves from operation 520 to operation 530. If the access rule(s) are not satisfied, then operation 525 is performed where the traffic is blocked.

Although the identity proxy and access gateway 110 is configured as the identity provider for the third-party application, in the example of FIG. 5 the identity proxy and access gateway 110 cannot independently authenticate the user. Instead, the identity proxy and access gateway 110 proxies the identity request with one or more identity providers 115. In an embodiment, one or more identity provider(s) 115 are presented to the client device for selection, where the identity provider(s) that are presented can be configured by a customer of the system. Thus, at operation 530, the identity proxy and access gateway 110 transmits an identity provider selection page to the client device 105. The identity provider selection page includes the one or more identity provider options configured by the customer.

Next, at operation 535, the identity proxy and access gateway 110 receives a selection of an identity provider from the client device 105. Next, at operation 540, the identity proxy and access gateway 110 causes the client device to transmit a second authentication request to the selected identity provider 115 for authenticating the user. The identity proxy and access gateway 110 may generate the second authentication request. For this authentication request, the identity proxy and access gateway 110 essentially is taking the role of a service provider. This authentication request may be a SAML AuthnRequest. Prior to transmitting the second authentication request, the identity proxy and access gateway 110 may enforce a set of one or more access rules to determine whether to proceed with the request.

The identity provider 115 and the client device 105 perform an authentication procedure according to the rules and requirements of that identity provider 115. For instance, the user may submit login credentials to prove their identity and may be asked to perform a multifactor authentication. These rules and requirements are independent of the rules enforced by the identity proxy and access gateway 110. If the user successfully proves their identity, the identity provider 115 generates and transmits an authentication response for the client device 105 that identifies that the user has successfully authenticated to the identity provider 115. The authentication response is configured to be transmitted by the client device 105 to the identity proxy and access gateway 110 (e.g., the client device may be redirected to the identity proxy and access gateway 110). The authentication response may be a SAML AuthnResponse, an OIDC response, or other protocol for sending identity.

In an embodiment where the identity proxy and access gateway 110 does not receive all outgoing traffic from the client device 105 and all incoming traffic to the client device 105, the client device 105 receives the authentication response without the identity proxy and access gateway 110 receiving or processing the response. In an embodiment where the identity proxy and access gateway 110 receives all outgoing traffic from the client device 105 and all incoming traffic to the client device 105 (e.g., using the gateway agent 107), the authentication response is received at the identity proxy and access gateway 110. In such an embodiment, the identity proxy and access gateway 110 may enforce a set of access rules as previously described and transmit this authentication response to the client device 105 only if the set of access rules are satisfied. In either embodiment, the client device 105 is configured to transmit the authentication response to the identity proxy and access gateway 110.

At operation 545, the identity proxy and access gateway 110 receives the authentication response from the client device 105 that was generated by the selected identity provider 115. The authentication response includes the user identity and may include other metadata (e.g., one or more attributes, one or more conditions, an authorization decision).

At operation 550, the identity proxy and access gateway 110 enforces a set of access rules including identity-based rule(s) and/or non-identity based rule(s) as previously described. The identity information is provided in the authentication response as well as possibly information from the agent executing on the client device 105. Enforcing the access rules may include determining the device posture of the client device 105 by accessing the EPP(s) 120 as previously described. If the access rule(s) are satisfied, then operation moves from operation 555 to operation 560. If the access rule(s) are not satisfied, then operation 525 is performed where the traffic is blocked.

At operation 560, the identity proxy and access gateway 110 generates and transmits a second authentication response to the client device 105 that is to be sent to the third-party application (e.g., the remote SaaS application 130). The second authentication response indicates that the user has successfully authenticated. The second authentication response may also include other metadata. The response may include a form with information for the client device 105 to transmit to the remote SaaS application 130. The second authentication response may be a SAML AuthnResponse, for example.

The client device 105 receives the second authentication response. The client device 105 transmits the second authentication response to the third-party application. In an embodiment where the identity proxy and access gateway 110 does not receive all outgoing traffic from the client device 105 and all incoming traffic to the client device 105, the second authentication response is transmitted to the third-party application without first being received or processed by the identity proxy and access gateway 110. In an embodiment where the identity proxy and access gateway 110 receives all outgoing traffic from the client device 105 and all incoming traffic to the client device 105 (e.g., using the gateway agent 107), the second authentication response is received at the identity proxy and access gateway 110. In such an embodiment, the identity proxy and access gateway 110 may enforce a set of access rules as previously described and transmit the second authentication response to the third-party application only if the set of access rules are satisfied. In either embodiment, the third-party application receives the second authentication response and processes it accordingly.

Figure 6:
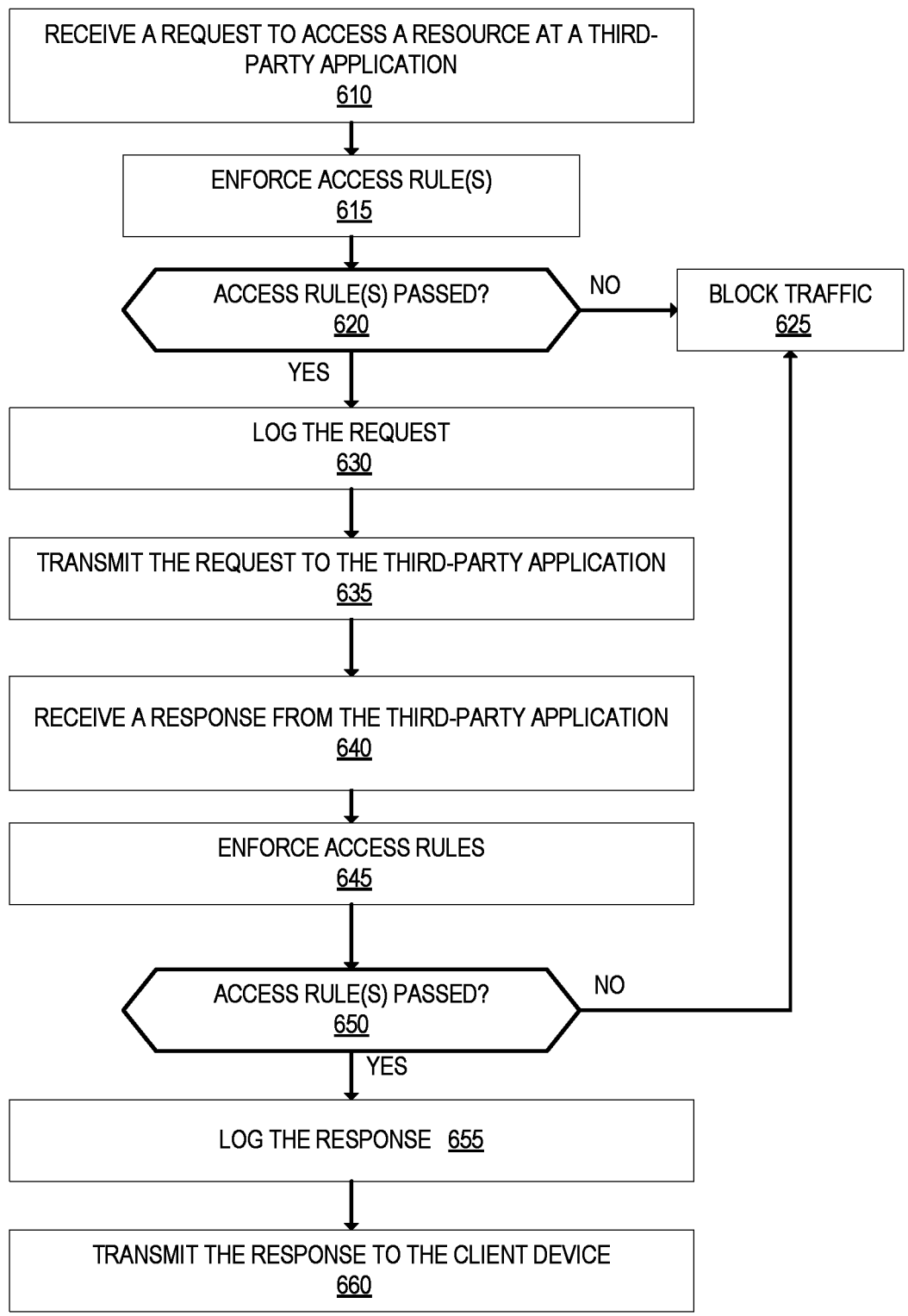
FIG. 6 is a flow diagram that illustrates exemplary operations performed at an identity proxy and access gateway according to an embodiment.

FIG. 6 is a flow diagram that illustrates exemplary operations performed at an identity proxy and access gateway according to an embodiment. The operations of FIG. 6 may be performed after a user has been successfully authenticated for access to a third-party application. At operation 610, the identity proxy and access gateway 110 receives a request to access a resource at a third-party application. The third-party application may be a remote SaaS application 130, for example. The request may include a proof of identity, such as a JWT, that indicates the user identity. The request may be to read a resource (e.g., view a page) of the third-party application, update a resource of the third-party application, add a resource of the third-party application, or delete a resource of the third-party application.

At operation 615, the identity proxy and access gateway 110 enforces a set of one or more access rules to determine whether the request is allowed to be transmitted to the third-party application. The access rule(s) may include identity-based rule(s) and/or non-identity based rule(s) as previously described. As an example, the rule may specify that traffic is not allowed to be transmitted to the third-party application unless the traffic is associated with a gateway agent installed on the client device (e.g., the gateway agent 107). Enforcing the access rules may include determining the device posture of the client device 105 by accessing the EPP(s) 120 as previously described. For example, if the request is to read a resource at the third-party application, the access rule(s) can be enforced to prevent the identified user from viewing that resource unless the access rule(s) are met (e.g., the user is authorized to view that resource and meets any other requirement such as a device posture requirement). As another example, if the request is to add a resource to the third-party application, update a resource of the third-party application, or delete a resource of the third-party application, the access rule(s) can be enforced to prevent the identified user from adding, updating, or deleting respectively the resource to the third-party application unless the access rule(s) are met. The identity proxy and access gateway 110 may use the standard proof of identity (e.g., a JWT) if included in the request when enforcing the set of access rules.

Enforcing the access rule(s) may include analyzing the content of the request (e.g., if the request is uploading or updating a resource of the remote SaaS application 130). For instance, the rule(s) may check for personal identifiable information, credit card numbers, data sets that contain specific information, data labels, certain keywords, or other data configured by the customer to determine whether the data can be transmitted. The data labels may be labeled with a category such as a security level category (e.g., unclassified, classified, top secret, etc.), an organization category (e.g., marketing, legal, human resources, engineering, etc.), and a location category. By way of example, a policy may be created that prevents users outside of a specific group of users from uploading a file that contains certain key phrases to any location other than a predefined location (e.g., a particular cloud storage provider).

If the access rule(s) are satisfied, then operation moves from operation 620 to operation 630. If the access rule(s) are not satisfied, then operation 625 is performed where the identity proxy and access gateway 110 blocks the traffic.

At operation 630, the identity proxy and access gateway 110 logs the request. The logged information may identify the resource requested (e.g., the URL of the resource), the user associated with the request, the time of the request, whether the request was successful, source IP address of the request, source port of the request, destination IP address of the request, destination port of the request, etc. The information that is logged may be different, and in some cases in addition to, the information that may be logged by the given third-party application. For instance, the third-party application may have its own internal logging functionality that may only log when someone successfully logs into the application; whereas the data logged by the identity proxy and access gateway service may log each request (e.g., each unique page visited) for the application in addition to when someone successfully logs into the application. Further, the logs for multiple remote SaaS applications can be accessed from a central location.

Next, at operation 635, the identity proxy and access gateway 110 transmits the request to the third-party application. The third-party application will receive the request and process the request accordingly. At operation 640, the identity proxy and access gateway 110 receives a response from the third-party application that is for the client device 105.

At operation 645, the identity proxy and access gateway 110 enforces a set of access rule(s) to determine whether access to the response is allowed. The access rule(s) may include identity-based rule(s) and/or non-identity based rule(s) as previously described and may include determining the device posture of the client device as previously described. Enforcing the access rule(s) may include analyzing the content of the requested asset. For instance, an access rule may be defined such that only certain user(s) can access a page that contains a certain keyword or certain asset. The page could be prevented from being sent to the client device or the sensitive information may be removed or redacted. This can be used to prevent sensitive data from being transmitted to the client device. As another example, the response may include a file that is labeled with a category and the access rule(s) may define the user(s) that are allowed to access files labeled with that category.

If the access rule(s) are satisfied, then operation moves from operation 650 to operation 655. If the access rule(s) are not satisfied, then operation 625 is performed where the identity proxy and access gateway 110 blocks the traffic.

At operation 655, the identity proxy and access gateway 110 logs the response. The logged information may identify the resource requested (e.g., the URL of the resource), the user associated with the request, the time of the request, whether the request was successful, source IP address of the request, source port of the request, destination IP address of the request, destination port of the request, list of file(s) downloaded in the request, list of file(s) blocked, reason why any file(s) were blocked, etc. The information that is logged may be different, and in some cases in addition to, the information that may be logged by the given remote SaaS application.

Next, at operation 660, the identity proxy and access gateway transmits the response to the client device. The operations of FIG. 6 can be performed for each request sent by the client device to the third-party application.

Figure 7:
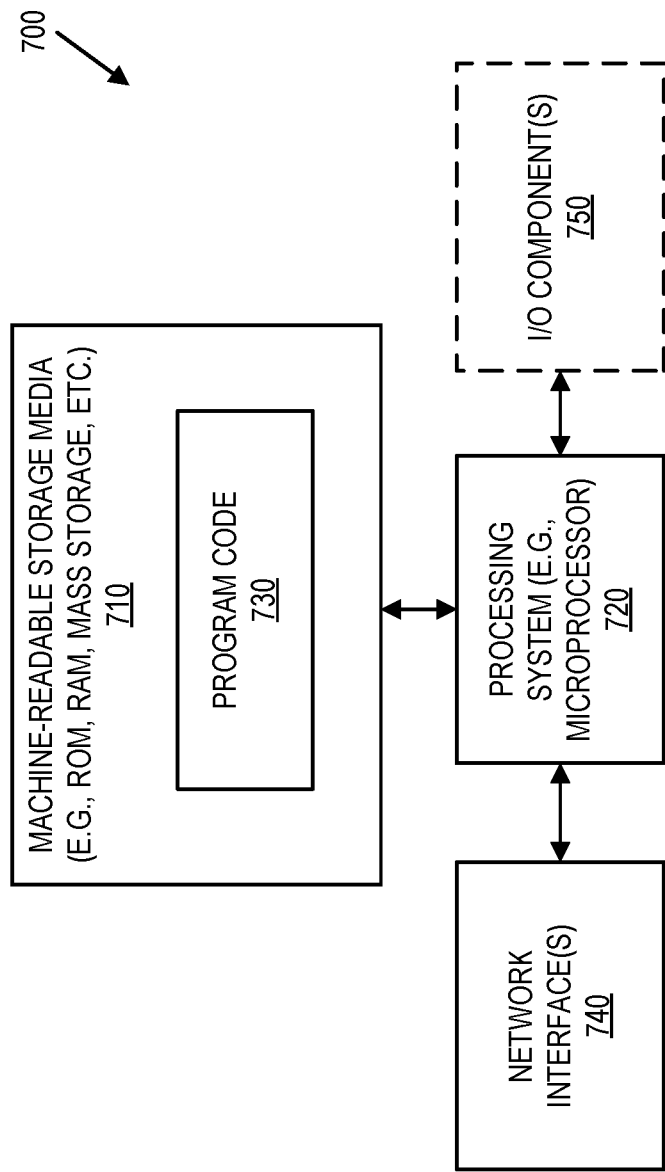
FIG. 7 illustrates a block diagram for an exemplary data processing system that may be used in some embodiments.

FIG. 7 illustrates a block diagram for an exemplary data processing system 700 that may be used in some embodiments. One or more such data processing systems 700 may be utilized to implement the embodiments and operations described with respect to the identity proxy and access gateway 110. Data processing system 700 includes a processing system 720 (e.g., one or more processors and connected system components such as multiple connected chips).

The data processing system 700 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 720. For example, the depicted machine-readable storage media 710 may store program code 730 that, when executed by the processor(s) 720, causes the data processing system 700 to execute any of the operations described herein.

The data processing system 700 also includes one or more network interfaces 740 (e.g., a wired and/or wireless interfaces) that allows the data processing system 700 to transmit data and receive data from other computing devices, typically across one or more networks (e.g., Local Area Networks (LANs), the Internet, etc.). The data processing system 700 may also include one or more input or output ("I/O") components 750 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 700, and, in certain embodiments, fewer components than that shown in One or more buses may be used to interconnect the various components shown in FIG. 7.

The techniques shown in the figures can be implemented using code and data stored and executed on one or more electronic devices (e.g., a client device, an identity proxy and access gateway, an origin server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding of the present invention. It will be appreciated, however, by one skilled in the art that embodiments may be practiced without such specific details. In other instances, control structures, gate level circuits and full software instruction sequences have not been shown in detail in order not to obscure embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in an identity proxy and access gateway, comprising:
   receiving a first authentication request from a client device that has been generated by a third-party application in response to a first access request from the client device to the third-party application requesting access to a resource at the third-party application, wherein the first authentication request is requesting an authentication of a user that is attempting to access the third-party application, and wherein the identity proxy and access gateway is configured as a first identity provider of the third-party application;
   transmitting an identity provider selection page to the client device, the identity provider selection page including one or more identity provider options for the user to select for authentication;
   receiving, from the client device, a selection of one of the one or more identity provider options; causing the client device to transmit a second authentication request to a second identity provider corresponding to the selected one of the one or more identity provider options;
   receiving, from the client device, a first authentication response that was generated by the second identity provider that indicates the user has successfully authenticated to the second identity provider;
   enforcing a first set of one or more access rules to determine whether the user is permitted to access the third-party application, wherein the first set of one or more access rules is enforced independently from any rules enforced at the second identity provider;
   determining, from the enforcing of the first set of one or more access rules, that the user is permitted to access the third-party application, and responsive to this determination, generating a second authentication response that-indicates the user has successfully authenticated; and
   transmitting the second authentication response to the client device, wherein the second authentication response is caused to be transmitted to the third-party application that indicates the user has successfully authenticated.

2. The method of claim 1, wherein the first set of one or more access rules includes one or more identity-based rules and one or more non-identity based rules.

3. The method of claim 1, wherein transmitting the identity provider selection page to the client device further comprises:
   enforcing a second set of one or more access rules including one or more non-identity based rules to determine whether to proceed with the first authentication request; and
   transmitting the identity provider selection page to the client device when the one or more non-identity based rules are satisfied.

4. The method of claim 3, wherein enforcing the second set of one or more access rules including the one or more non-identity based rules to determine whether to proceed with the first authentication request further comprises:
   accessing an endpoint protection provider to determine a posture of the client device; and
   determining one or more non-identity based parameters based on the request.

5. The method of claim 1, wherein causing the client device to transmit the second authentication request to the second identity provider corresponding to the selected one of the one or more identity provider options further comprises:
   generating the second authentication request to the second identity provider; and
   redirecting the client device to transmit the second authentication request to the second identity provider.

6. The method of claim 1, further comprising:
   generating a signed token, the signed token including information indicating the user has successfully authenticated to the second identity provider and user information; and providing the signed token to the client device in the second authentication response.

7. The method of claim 6, further comprising:
transmitting the signed token to the third-party application.

8. A non-transitory machine-readable storage medium that provides instructions that, if executed by a processor of an identity proxy and access gateway, will cause said processor to perform operations comprising:
receiving a first authentication request from a client device that has been generated by a third-party application in response to a first access request from the client device to the third-party application requesting access to a resource at the third-party application, wherein the first authentication request is requesting an authentication of a user that is attempting to access the third-party application, and wherein the identity proxy and access gateway is configured as a first identity provider of the third-party application;
transmitting an identity provider selection page to the client device, the identity provider selection page including one or more identity provider options for the user to select for authentication;
receiving, from the client device, a selection of one of the one or more identity provider options;
causing the client device to transmit a second authentication request to a second identity provider corresponding to the selected one of the one or more identity provider options;
receiving, from the client device, a first authentication response that was generated by the second identity provider that indicates the user has successfully authenticated to the second identity provider;
enforcing a first set of one or more access rules to determine whether the user is permitted to access the third-party application, wherein the first set of one or more access rules is enforced independently from any rules enforced at the second identity provider;
determining, from the enforcing of the first set of one or more access rules, that the user is permitted to access the third-party application, and responsive to this determination, generating a second authentication response that-indicates the user has successfully authenticated; and
transmitting the second authentication response to the client device, wherein the second authentication response is caused to be transmitted to the third-party application that indicates the user has successfully authenticated.

9. The non-transitory machine-readable storage medium of claim 8, wherein the first set of one or more access rules includes one or more identity-based rules and one or more non-identity based rules.

10. The non-transitory machine-readable storage medium of claim 8, wherein transmitting the identity provider selection page to the client device further causes said processor to perform operations comprising:
enforcing a second set of one or more access rules including one or more non-identity based rules to determine whether to proceed with the first authentication request; and
transmitting the identity provider selection page to the client device when the one or more non-identity based rules are satisfied.

11. The non-transitory machine-readable storage medium of claim 10, wherein enforcing the second set of one or more access rules including the one or more non-identity based rules to determine whether to proceed with the first authentication request further causes said processor to perform operations comprising:
accessing an endpoint protection provider to determine a posture of the client device; and
determining one or more non-identity based parameters based on the request.

12. The non-transitory machine-readable storage medium of claim 8, wherein causing the client device to transmit the second authentication request to the second identity provider corresponding to the selected one of the one or more identity provider options further causes said processor to perform operations comprising:
generating the second authentication request to the second identity provider; and
redirecting the client device to transmit the second authentication request to the second identity provider.

13. The non-transitory machine-readable storage medium of claim 8, wherein the operations further comprise:
generating a signed token, the signed token including information indicating the user has successfully authenticated to the second identity provider and user information; and
providing the signed token to the client device in the second authentication response.

14. The non-transitory machine-readable storage medium of claim 13, wherein the operations further comprise:
transmitting the signed token to the third-party application.

15. An apparatus, comprising:
a processor; and
a non-transitory machine-readable storage medium that provides instructions that, if executed by the processor, will cause an identity proxy and access gateway to perform operations comprising:
receive a first authentication request from a client device that has been generated by a third-party application in response to a first access request from the client device to the third-party application requesting access to a resource at the third-party application, wherein the first authentication request is requesting an authentication of a user that is attempting to access the third-party application, and wherein the identity proxy and access gateway is configured as a first identity provider of the third-party application;
transmit an identity provider selection page to the client device, the identity provider selection page including one or more identity provider options for the user to select for authentication;
receive, from the client device, a selection of one of the one or more identity provider options;
cause the client device to transmit a second authentication request to a second identity provider corresponding to the selected one of the one or more identity provider options;
receive, from the client device, a first authentication response that was generated by the second identity provider that indicates the user has successfully authenticated to the second identity provider;
enforce a first set of one or more access rules to determine whether the user is permitted to access the third-party application, wherein the first set of one or more access rules is enforced independently from any rules enforced at the second identity provider;
determine, from the enforcing of the first set of one or more access rules, that the user is permitted to access the third-party application, and responsive to this determination, generate a second authentication response that indicates the user has successfully authenticated; and transmit the second authentication response to the client device, wherein the second authentication response is caused to be transmitted to the third-party application that indicates the user has successfully authenticated.

16. The apparatus of claim 15, wherein the first set of one or more access rules includes one or more identity-based rules and one or more non-identity based rules.

17. The apparatus of claim 15, wherein transmitting the identity provider selection page to the client device further causes said processor to perform operations comprising:
   enforcing a second set of one or more access rules including one or more non-identity based rules to determine whether to proceed with the first authentication request; and
   transmitting the identity provider selection page to the client device when the one or more non-identity based rules are satisfied.

18. The apparatus of claim 17, wherein enforcing the second set of one or more access rules including the one or more non-identity based rules to determine whether to proceed with the first authentication request further causes said processor to perform operations comprising:
   accessing an endpoint protection provider to determine a posture of the client device; and
   determining one or more non-identity based parameters based on the request.

19. The apparatus of claim 15, wherein causing the client device to transmit the second authentication request to the second identity provider corresponding to the selected one of the one or more identity provider options further causes said processor to perform operations comprising:
   generating the second authentication request to the second identity provider; and
   redirecting the client device to transmit the second authentication request to the second identity provider.

20. The apparatus of claim 15, wherein the operations further comprise:
   generating a signed token, the signed token including information indicating the user has successfully authenticated to the second identity provider and user information; and
   providing the signed token to the client device in the second authentication response.

21. The apparatus of claim 20, wherein the operations further comprise:
   transmitting the signed token to the third-party application.

* * * * *